Figure 1:
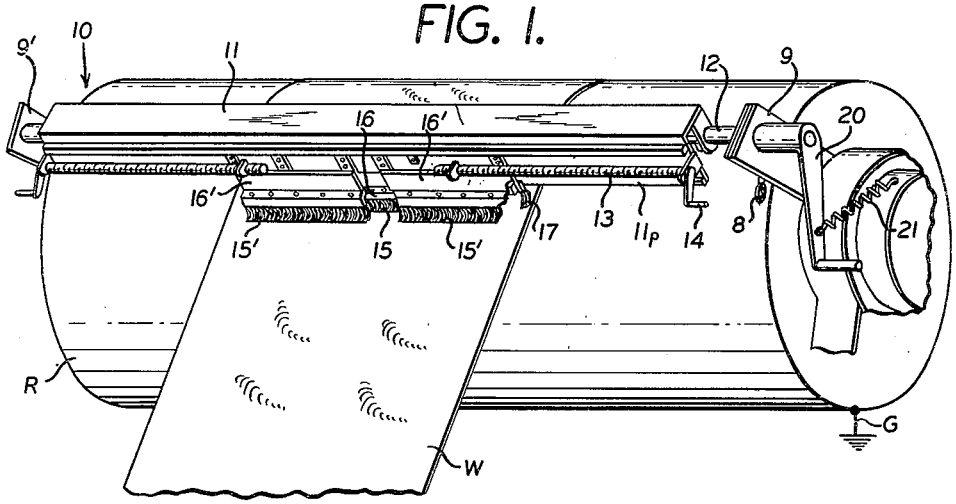

April 4, 1961     H. FOUNTAIN     2,978,636
FLAW DETECTING APPARATUS
Filed April 30, 1957     2 Sheets-Sheet 1

INVENTOR
HENRY FOUNTAIN
BY Herman Seid
Robert W. Siddler
ATTORNEYS.

INVENTOR
HENRY FOUNTAIN
BY Herman Seid
Robert W. Siddler
ATTORNEYS.

United States Patent Office 2,978,636
Patented Apr. 4, 1961

2,978,636

FLAW DETECTING APPARATUS

Henry Fountain, Madison, Conn., assignor to Viking Instruments, Inc., East Haddam, Conn., a corporation of Connecticut Filed Apr. 30, 1957, Ser. No. 656,130

16 Claims. (Cl. 324—54)

This invention relates to a quality control device, more particularly to a device for testing and detecting flaws to permit control of the quality of a web, or other sheet-like structure.

Contemporary fabrication processes usually require that the article fabricated have a given quality, before the item is released for distribution. In the production of web-like products such as paper, plastic sheeting, felting, or the like, the quality of the web produced is to a large extent determined by the flaws present in said article. In web fabricating industries, the defect encountered in the web is generally a void, as in the case of paper and the like felted products. Other flaws present are conductive inclusions which affect the use of the web as a dielectric or insulating material. It is thus necessary in determining the quality of the material produced to provide some means for determining the number of defects or flaws present in any given run of material. As is apparent, depending on the purposes for which the material is to be employed, the size of the flaw may or may not have an effect upon the quality of the web produced. Thus, any detecting mechanism should be able to discriminate between flaws of different sizes, and should additionally be subject to adjustment so as to permit use of the flaw detecting device for different runs of material.

It is with the above problems in mind that the present means have been evolved, means aiding in the quality control, during fabrication, of web-like items. The detecting device is adjustable to discriminate defects of different magnitudes, whereby, depending on the quality of web to be produced, only given defects will be discerned.

It is accordingly a primary object of this invention to provide an improved materials testing apparatus, particularly suited for the testing of web-like materials.

An additional object of this invention is to provide a testing apparatus which is adjustable to discriminate defects of different magnitudes.

Another object of the invention is to provide a testing apparatus for detecting voids in a web.

It is also an object of this invention to provide an apparatus for detecting conductive inclusions in sheet materials.

A further object of the invention is to provide a void-detecting device which is adjustable to detect web defects of any given magnitude.

Another object of this invention is to provide a testing apparatus for tallying and/or annunciating the defects in a web.

A still further object of the invention is to provide a testing apparatus which has no deleterious effect upon the item tested.

A further object of the invention is to provide a testing device of a simple, compact nature, readily subject to positioning in conjunction with web fabricating equipment, and requiring minimum maintenance.

These and other objects of the invention, which will become apparent from the following description and claims, are achieved by setting up an electrical circuit, including one of the rolls conventionally employed in the fabrication of a web. As is apparent, standard fabrication techniques employ a plurality of spaced rolls over which the web will pass. These rolls are generally formed of a metal material, and hence, are readily suitable for incorporation into an electrical circuit. Within the scope of this invention, it is contemplated employing one of these rolls within the electrical circuit of the testing apparatus, or alternatively providing an auxiliary roll. The former arrangement is preferred. Mounted adjacent this roll, and forming a part of the electrical circuit, is a contacting brush member, arranged to wipe the roll surface. During the web fabricating operation, this wiping action is interrupted by the passage of the web between the brush and the roll. The brush is adjustable in width to accommodate varying webs. The electrical circuit further comprises: a gating circuit, which controls the passage of current through the electrical circuit as a function of web defects, an integrator for sensing the time of current flow passed by said gating circuit, a triggering circuit actuated by the integrating circuit, and a controlled element such as a counter, signal device, or control device, which is actuated when the integrator has sensed a current passage of preselected duration by said gating circuit.

A primary feature of the invention is that the testing device is adjustable so as to respond to flaws larger than a preselected magnitude, whereby a given tolerable range of imperfections will be permitted to pass.

An additional feature of the invention resides in the fact that the integerator circuit serves to permit only given impulses to pass, to actuate the control element.

Another feature of the invention resides in the fact that the gating circuit is responsive only to flaws in the web, and not to extraneous effects.

Figure 2:
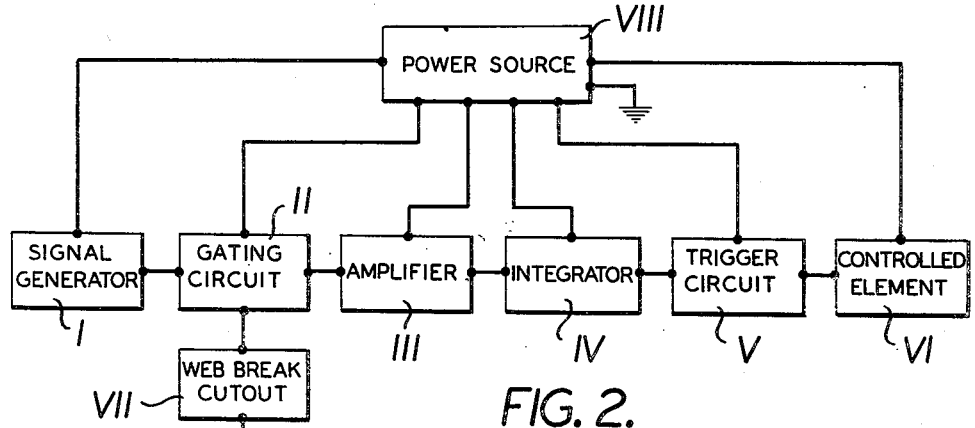
Figure 4:
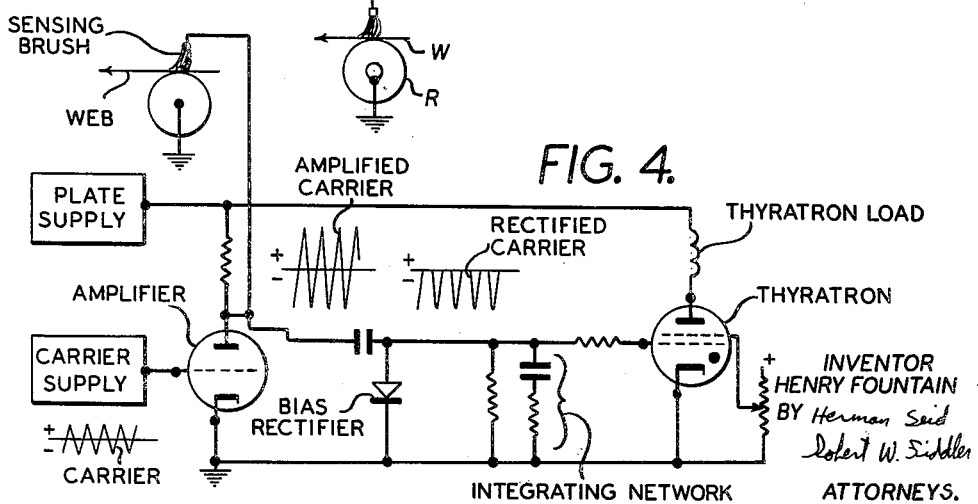
Figure 3:
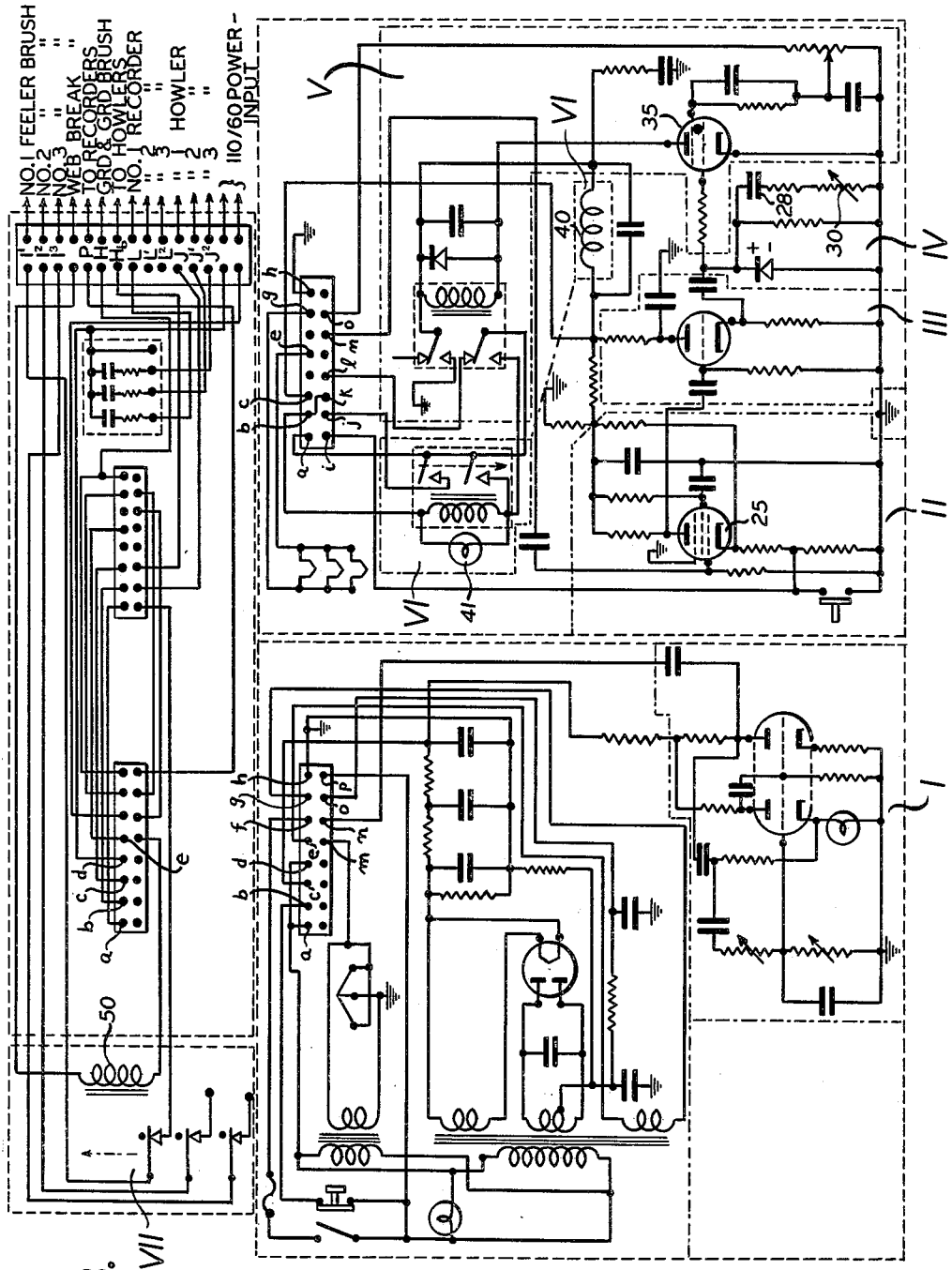

A specific embodiment of this invention will be made most manifest, and particularly pointed out, in conjunction with the accompanying drawings, wherein:

Figure 1 is a perspective view of the wiper brush, arranged in conjunction with the roll to permit detection of flaws in any web passing over said roll; and Figure 2 is a schematic block diagram of the electrical circuit components arranged in conjunction with said roll and brush; and Figure 3 is an electrical circuit diagram illustrating a preferred embodiment of a circuit which may be employed in the block diagram of Figure 2; and Figure 4 is a simplified schematic diagram of an alternative embodiment of an electrical circuit employing an interrupted signal or carrier.

Referring now more particularly to the drawings, like numerals in the various figures will be taken to designate like parts.

As seen in Figure 1, a roll R formed of a conducting material, or having a conducting surface, is arranged to permit web W to pass thereover. The surface of this roll is grounded to G, as shown schematically to the right of Figure 1. In practice, the roll is formed generally of a metal conducting material, such as steel or the like, and is grounded from its axis. However, the invention may readily be practiced by providing a roll of any material with a conducting surface, with said surface grounded in any suitable fashion. Even where the roll is a steel roll of a conducting nature, such as is conventionally employed in web fabricating operations, it is desirable to provide surface grounding means for said roll. This is most readily accomplished by providing grounding brushes 8 wiping the roll surface and connected in an electrical circuit (not shown) to the ground connection G. Grounding brush 8 is supported on bracket arm 9, arranged at one side of the roll R. A similar bracket arm 9¹ is arranged on the opposite side of the roll R. Bracket arm 9 forms part of the circuit from grounding brush 8 to ground G. A feeler brush assembly 10 is supported between bracket arm 9 and bracket arm 9¹. The feeler brush assembly is mounted over the roll R, and feeler brushes are adjustably supported thereon. These feeler brushes are formed of fibres of conducting material, such as copper or the like.

Feeler brush assembly 10 comprises a yoke 11 pivotally supported on mounting rod 12, arranged between bracket arms 9 and 9¹. Yoke plate 11p, forming part of yoke 11, has mounted thereon an adjusting screw 13, which may be turned by crank 14. Fixed feeler brush 15 is mounted on a non-conductive brush plate 16 formed of Bakelite, or the like. The plate 16 is secured centrally to said yoke plate 12. Movable feeler brushes 15 are mounted on electrically non-conductive brush plates 16¹, which are supported in screw thread engagement with adjusting screws 13. Each brush plate and its associated brush is insulated from all others, and from the rest of the assembly, since the plates 16, 16¹ are non-conductors.

A web break detector brush is supported from the rear of plates 16¹ to engage the edges of the web W.

Mounting arm 20 engages rod 12 and extends through mounting bracket 9, and may be spring biased by spring 21 to force feeler brush assembly 10 to the position shown in Figure 1. The modes of operation of the heretofore described structure will become hereinafter more apparent.

As best seen in Figure 2, the roll R is arranged in a circuit having a signal generator I, a gating circuit II, an amplifier III, an integrator IV, a triggering circuit V, and a controlled element circuit VI. Power is supplied from a power source VIII. A web break cutout switch VII may be provided between the roll R and the gating circuit to detect a web break, and prevent erroneous indication by the apparatus. The operation of the components employed in forming the circuit, as illustrated in block diagram, will become more apparent when considered in the light of the circuit diagram of Figure 3.

In Figure 3, the circuit diagram is shown as comprising two plug-in units, outlined in dash line. Dot-dash lines have been employed to indicate which of the circuit components correspond to the blocks indicated on the block diagram, and have been similarly numbered. In the present embodiment, though one right hand plug-in unit has been shown, one plug-in unit of the type shown on the right is provided for each feeler brush.

The signal generator portion of the circuit labeled I is such as to provide a constant A.C. signal of between 16 and 20 kc. The output of this signal generator is fed to a gating circuit II.

Gating circuit II includes an amplifier tube 25, here shown of a 6BH6 type. This tube is normally biased to cut off by a positive potential on its cathode. As seen in the block diagram, the completion of the circuit through brushes 11 and roll R, as occurs upon the presence of a flaw in web W, keys the tube 25 to permit the signal from a signal generator I to pass through the gating circuit II to amplifier III. A test switch 26 is provided to permit keying of the tube 25 in the absence of a web flaw, so as to test the apparatus function.

Amplifier III is of a conventional amplifier circuit type, employing a triode of a 6C4 type, as clearly seen in the circuit diagram. It is, of course, apparent that a variety of other amplification stages may be employed either in place of, or in combination with, the here disclosed amplification stage.

Once a signal has been permitted to pass by actuation of the gating circuit, due to the presence of a flaw in the web, the signal, after amplification, passes to a timing or integrating circuit IV. Integrator IV includes a rectifier 27 placing a D.C. voltage across condenser 28 in series with a variable resistance 30. The variable resistance 30 determines the time necessary to raise the condenser voltage to attain a given output potential from the integrator, and is adjusted so that this potential is attained only when the gating circuit has passed a signal of given duration, as controlled by the size of the flaw to be detected. Once this voltage is attained, the triggering circuit V is actuated.

Controlled element circuit VI includes a thyratron 35 of a 2D21 type. The shield grid of the thyratron is negatively biased to prevent current flow in the thyratron until a sufficient positive potential appears at the signal grid to overcome this negative shield grid bias, and fire the thyratron. Once the tube is fired, a counter 40 and/or annunciator is activated along with signal light 41.

A web break cutout safety switch circuit VII is provided between the detecting brush assembly 10 and the gating circuit II. This web break cutout circuit is illustrated in Figure 3 at the upper left hand corner, and comprises a relay 50 for opening the circuit from the feeler brushes to gating circuit II, whereby the feeler brushes are inoperative to actuate the aforementioned components, for a purpose to become hereinafter more apparent.

The alternative embodiment illustrated in Figure 4 has been provided to permit employment of a continuous signal output flowing from the signal generator. In this arrangement, the signal generator output is rectified, and the rectified signal is employed to provide a negative bias to a thyratron grid, thus maintaining the thyratron quiescent. Gating of the signal is accomplished by coupling the brush 11 to the plate of the amplifier tube (or to the plate of the signal oscillator). The presence of a flaw in the web will thus short out the amplifier (or oscillator), thus interrupting the carrier signal, and removing the bias from the thyratron, which fires forthwith. The bias voltage decay is a function of the duration of signal interruption and of the constants in the integrating network.

*Operation*

In operation, the above disclosed structure may be best employed as a quality control in the fabrication of endless webs, such as paper, or the like. As noted, the primary defects conventionally encountered in such web structures are voids, or undesirable inclusions, such as conductive inclusions in insulating sheets.

Webs of the above noted types are conventionally formed by passing the raw materials through a variety of production stages with the formed web trained over a series of rolls. In use, the herein disclosed novel flaw detector was found most applicable as a quality control instrument in the paper making arts. Where so employed, it is recommended that feeler brush assembly 10 be mounted in conjunction with a roll after the calender stack, or as close to the stack as possible. Installation at this point insures the detection of flaws occurring at any point in the prior manufacturing process, and further permits the fabricated web to be tested in a relatively dry condition, thus preventing any damage by the feeler brush.

The electronic components employed in the illustrated circuitry are housed in a unit mounted as close to the feeler brush assembly as possible to eliminate any high resistance ground leakage. The brushes 15 are arranged at a suitable angle to the tangent to the roll at the point of contact to insure wiping, and the web is preferably trained to provide at least 6 inches of wrap around the roll.

One side of roll R is grounded, and a voltage of approximately 70 volts is applied between the brush assembly 10 and the roll R. This relatively low voltage serves to insure the safety of operating personnel. Crank 14 is rotated to turn screw 13 to bring brushes 15¹ to a position extending over the web.

The power source VIII is suitably coupled to a current supply, and the signal generator I is actuated to put out a 16–20 kc. A.C. signal. In the embodiment illustrated in Figure 3, the gating circuit II serves to permit the passage of the signal only upon the occurrence of a flaw in web W. The gated signal is then amplified in amplifier III, and fed to integrator circuit IV, where the signal is rectified and placed across condenser 28.

In order to prevent the occurrence of a web break from triggering the annunciators or signalling elements to give an erroneous reading, a web break cutout safety switch has been provided. Upon the occurrence of a web break, a single indication is recorded by the apparatus of the occurrence of a defect. Since if current were permitted to pass through feeler brushes 11, as would be the case in the event of a web break, signalling would continue indefinitely; by providing web break cutout brushes 19, a web break, which usually extends completely across the web, will be immediately detected. The detection of this break serves to actuate relay 50 to break the circuit from the brushes to the gating circuit, whereby no signal will be permitted to pass by said gating circuit until the break is remedied. It will of course be apparent to those skilled in the art, that it is desirable to provide an audible signal for actuation by the web break circuit, so as to permit rapid elimination of the fault.

The sensitivity of the system, that is, the magnitude of a flaw necessary to produce a response, is regulated in two ways. The primary sensitivity control is provided in the variable resistance 30, which determines the flaw magnitude necessary to actuate triggering circuit V. Secondary control of sensitivity may be accomplished by regulating web speed. As is apparent, the time duration of current flow between the brush 11 and the roll R determines the signal permitted to pass by the gating circuit. For any given flaw, the period of signal duration diminishes in inverse proportion to web speed. The signal passing the integrator fires thyratron 35, thus actuating any one of a variety of control elements. Here a counter 40, and signal lamp 41 have been shown, but it is of course apparent to those skilled in the art that a variety of other signalling, recording, annunciating, or control elements may be employed without departing from the scope of the invention.

In the embodiment illustrated in the schematic circuit shown in Figure 4, the quality control functions above noted are attained by employing a carrier signal to negatively bias a thyratron tube to a quiescent state. The presence of a flaw in the web to be tested permits current to flow through the detecting brush, removing this bias, causing the thyratron to fire, actuating any control element of the aforementioned type.

It is thus sene that a novel flaw detecting apparatus has been provided which is eminently suitable as a quality control means in the production of web-like products. The novel apparatus is of a simple nature, occupying a minimum of space, subject to ready maintenace, and subject to adjustment so as to permit detection of flaws larger than a given magnitude.

The above disclosure has been given by way of illustration and elucidation, and not by way of limitation, and it is desired to protect all embodiments of the herein disclosed inventive concept within the scope of the appended claims.

What is claimed is:

1. A flaw detecting apparatus comprising: a signal source; a gating circuit normally biased to prevent the passage of current therethrough electrically coupled to said source controlling the passage of a constant level signal from said source in response to the presence or absence of flaws in a material to be tested; an integrator electrically connected to said gating circuit summing the signal passed by said gating circuit; and means electrically connected to said integrator actuated by the output of said integrator.

2. Apparatus as in claim 1, in which a safety switch is provided in the gating circuit for deactivating same upon the absence of material to be tested.

3. Apparatus as in claim 1, in which said means actuated by the output of said integrator comprises: a triggering circuit, said circuit including an element firing only upon the passage of a signal by said integrator; and indicating means electrically connected to said triggering circuit registering upon said firing.

4. Apparatus as in claim 3, in which means are provided for scanning the material to be tested, said means electrically connected to and activating said gating circuit, whereby said gating circuit will permit passage of said constant level signal for a time period proportional to the magnitude of any flaw.

5. A flaw detecting apparatus for detecting flaws in a web, said apparatus comprising: a roll over which the web is trained, said roll having an electrically conducting surface; means electrically grounding the surface of said roll; a feeler brush assembly mounted over said roll in wiping contact therewith, said assembly including a feeler brush adapted to be maintained out of electrical contact with said roll by the passage of the web; a gating circuit normally biased to prevent the passage of a signal therethrough electrically coupled to said feeler brush assembly and adapted to have the biasing removed upon the passage of current from said brush to permit the passage of a constant level signal through said gating circuit; a signal generator supplying a constant level signal to said gating circuit; an integrator receiving the signal permitted to pass by said gating circuit; and a controlled element circuit receiving the output from said integrator when signals totalling a given magnitude have been passed by said integrator, said controlled element circuit including indicating means, whereby, when a signal is received by said controlled element circuit, the presence of a flaw will be indicated.

6. Apparatus as in claim 5, in which a web break safety switch circuit is provided between the brush assembly and the gating circuit, said safety switch circuit deactivating said brush assembly upon the occurrence of a web break to prevent the passage of signal by said gating circuit.

7. Apparatus as in claim 5, in which a triggering circuit is provided between said integrator and said controlled element circuit, said triggering circuit including a firing element which permits actuation of the controlled element circuit only when said firing element is fired.

8. Apparatus as in claim 5, in which said signal generator supplies an A.C. signal.

9. Apparatus as in claim 8, in which a rectifier is provided in said integrator circuit for rectifying the A.C. signal.

10. In a web flaw detecting apparatus for detecting flaws in a web passing over an electrically conducting roll, said apparatus including an electrical circuit actuated by the presence of a flaw in the web; a feeler brush assembly for detecting the web flaw, said assembly comprising: a rod supported over the roll; a yoke pivotally supported on said rod; a brush plate movably supported by said yoke; a feeler brush on said brush plate; a screw extending between said brush plate; and a crank arm on said screw for turning same to adjust the relative positions of said plate, whereby the brushes may be moved over the full width of the web to be tested.

11. Apparatus as in claim 10, in which said brush is of an electrically conducting material, and said brush plate is of an insulating material, whereby the brush will be insulated from said brush assembly.

12. Apparatus as in claim 11, in which said assembly includes: a fixed brush plate of non-conducting material and a brush of conducting material, said fixed plate and brush positioned in overlapping relationship with said aforementioned plate and brush, whereby said brushes may be extended over the full width of the web to be tested.

13. A flaw detecting apparatus comprising: a signal generating source emitting a continuous constant level A.C. signal; means normally biased to prevent the flow of current therethrough electrically coupled to said source and controlling the passage of said signal to permit same to pass only upon the occurrence of a flaw in the material to be tested; a rectifier electrically connected to said means for rectifying the passed signal; an integrator to which said passed signal is fed, said integrator including a condenser subject to charging to a preselected voltage; and indicating means electrically coupled to said integrator responsive to the occurrence of said preselected voltage on the condenser to indicate a flaw.

14. Apparatus as in claim 13, in which a safety switch is provided in the gating circuit for deactivating same upon the absence of material to be tested.

15. Apparatus as in claim 13, in which a triggering circuit is provided between said integrator and said indicating means, said triggering circuit including a firing element which fires upon the occurrence of said preselected voltage on the condenser to actuate the indicating means.

16. Apparatus as in claim 15, in which means are provided for scanning the material to be tested, said means activating said gating circuit.

References Cited in the file of this patent

UNITED STATES PATENTS

| | | |
|---|---|---|
| 1,824,745 | Allen | Sept. 22, 1931 |
| 2,220,489 | Lowkrantz | Nov. 5, 1940 |
| 2,506,454 | Holmwood | May 2, 1950 |
| 2,701,336 | Anderson | Feb. 1, 1955 |
| 2,752,589 | De Long | June 26, 1956 |
| 2,765,405 | Gamarekian | Oct. 2, 1956 |
| 2,873,425 | Huggins | Feb. 10, 1959 |
| 2,916,697 | Boode | Dec. 8, 1959 |
| 2,942,248 | Huggins | June 21, 1960 |

FOREIGN PATENTS

| | | |
|---|---|---|
| 681,779 | Great Britain | Oct. 29, 1952 |
| 741,164 | Great Britain | Nov. 30, 1955 |